(12) United States Patent
Zhu et al.

(10) Patent No.: US 10,754,043 B2
(45) Date of Patent: Aug. 25, 2020

(54) RECEIVER AND RECEIVING METHOD FOR NAVIGATION SIGNALS

(71) Applicant: Tsinghua University, Beijing (CN)

(72) Inventors: Yonghui Zhu, Beijing (CN); Xiaowei Cui, Beijing (CN); Mingquan Lu, China (CN)

(73) Assignee: TSINGHUA UNIVERSITY, Beijing (CN)

( * ) Notice: Subject to any disclaimer, the term of this patent is extended or adjusted under 35 U.S.C. 154(b) by 468 days.

(21) Appl. No.: 15/509,622

(22) PCT Filed: Sep. 16, 2015

(86) PCT No.: PCT/CN2015/089709
§ 371 (c)(1),
(2) Date: Mar. 8, 2017

(87) PCT Pub. No.: WO2016/041493
PCT Pub. Date: Mar. 24, 2016

(65) Prior Publication Data
US 2017/0285174 A1 Oct. 5, 2017

(30) Foreign Application Priority Data
Sep. 19, 2014 (CN) .......................... 2014 1 0484162

(51) Int. Cl.
*G01S 19/29* (2010.01)
*G01S 19/30* (2010.01)
*G01S 19/36* (2010.01)
*G01S 19/37* (2010.01)
*G01S 19/14* (2010.01)

(52) U.S. Cl.
CPC .............. *G01S 19/29* (2013.01); *G01S 19/30* (2013.01); *G01S 19/14* (2013.01); *G01S 19/36* (2013.01); *G01S 19/37* (2013.01)

(58) Field of Classification Search
CPC .......... G01S 19/29; G01S 19/30; G01S 19/13; G01S 19/14; G01S 19/35; G01S 19/36; G01S 19/37
USPC ............ 342/357.68, 357.51, 357.52, 357.69, 342/357.75, 357.76, 357.77
See application file for complete search history.

(56) References Cited

U.S. PATENT DOCUMENTS

| | | | | |
|---|---|---|---|---|
| 5,541,606 A | * | 7/1996 | Lennen | G01S 19/32 342/352 |
| 5,621,416 A | * | 4/1997 | Lennen | G01S 19/32 342/352 |

(Continued)

FOREIGN PATENT DOCUMENTS

CN 103675852 A1 3/2014

*Primary Examiner* — Chuong P Nguyen

(57) ABSTRACT

A receiver and a receiving method for receiving wideband binary-offset-carrier modulated signals. The receiver includes a tracking apparatus which includes an upper sideband processor operable to generate upper sideband correlations through correlating a local upper sideband replica against a received navigation signal, a lower sideband processor operable to generate lower sideband correlations through correlating a local lower sideband replica against the received navigation signal, and an estimator operable to determine a delay estimate based on the upper sideband correlations and the lower sideband correlations.

16 Claims, 5 Drawing Sheets

(56) References Cited

U.S. PATENT DOCUMENTS

| | | | |
|---|---|---|---|
| 7,447,259 B2 * | 11/2008 | Betz | H04B 1/70752 |
| | | | 375/142 |
| 8,149,897 B2 * | 4/2012 | Abraham | G01S 19/30 |
| | | | 348/611 |
| 8,804,865 B2 * | 8/2014 | Elenes | H04H 60/12 |
| | | | 375/267 |
| 8,964,813 B2 * | 2/2015 | Hodgart | G01S 19/29 |
| | | | 375/140 |
| 10,355,705 B2 * | 7/2019 | Schmidt | H03M 1/1038 |
| 2004/0071200 A1 * | 4/2004 | Betz | H04B 1/70752 |
| | | | 375/152 |
| 2007/0201537 A1 | 8/2007 | De Wilde et al. | |
| 2013/0003904 A1 * | 1/2013 | Elenes | H04H 40/18 |
| | | | 375/350 |
| 2019/0041527 A1 * | 2/2019 | Gustafson | G01S 19/30 |

* cited by examiner

RECEIVER AND RECEIVING METHOD FOR NAVIGATION SIGNALS

CROSS REFERENCE TO RELATED APPLICATION

The present application claims priority to (is a US National Stage Filing of) PCT Application No. PCT/CN2015/089709 filed Sep. 16, 2015 entitled "Receiver And Receiving Method For Navigation Signals". The aforementioned PCT application claims priority to Chinese Patent Application No. 20141048162.7 filed Sep. 19, 2014. The entirety of each of the two aforementioned references is incorporated herein by reference for all purposes.

TECHNICAL FIELD

The present application relates generally to a receiver and a receiving method for navigation signals, and more specifically, a receiver and a receiving method for receiving wideband binary-offset-carrier modulated signals.

BACKGROUND

Global Navigation Satellite System (GNSS) receiver estimates delays in navigation signals received from multiple satellites and uses this information, in combination with the ephemeris information of the satellites, to estimate the receiver's position and time information. The more accurately the delays in the navigation signals are estimated, the more precisely the position and time information could be calculated in the receiver.

Traditional navigation signals, typically the L1CA signals of Global Positioning System (GPS), are modulated using a Binary Phase Shift Keying (BPSK) modulation. A BPSK-modulated signal comprises a pseudo random code and a carrier. With the development of GPS, Galileo Navigation Satellite System and BeiDou Navigation Satellite System, the wideband binary-offset-carrier (BOC) modulated signals with the better performance, including signals modulated in BOC, AltBOC, ACEBOC, TD-AltBOC, TMBOC and CBOC, etc., are adopted for the next generation of navigation signals. In these modulated signals, a sub-carrier is introduced based on the traditional BPSK-modulated signals to achieve the split spectrum feature.

SUMMARY

The present application is generally related to systems, methods, apparatus, circuits, and/or devices for receiving wideband binary-offset-carrier modulated signals.

In some embodiments of the present inventions, a receiver for receiving navigation signals is disclosed, wherein the navigation signals are wideband BOC modulated signals, and the receiver comprises a tracking apparatus, wherein the tracking apparatus comprises: an upper sideband processor operable to generate upper sideband correlations through correlating a local upper sideband replica against a received navigation signal, a lower sideband processor operable to generate lower sideband correlations through correlating a local lower sideband replica against the received navigation signal, and an estimator operable to determine a delay estimate based on the upper sideband correlations and the lower sideband correlations.

In various embodiments of the present inventions, a receiving method for receiving navigation signals, wherein the navigation signals are wideband BOC modulated signals, and the method comprises: generating upper sideband correlations through correlating a local upper sideband replica against a received navigation signal, generating lower sideband correlations through correlating a local lower sideband replica against the received navigation signal, and determining a delay estimate based on the upper sideband correlations and the lower sideband correlations.

Figure 1:
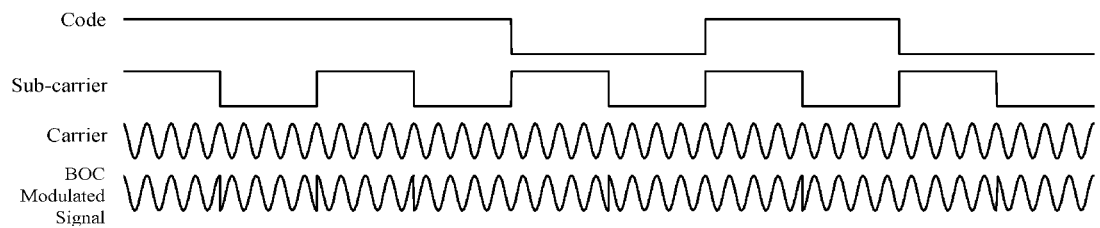
FIG. 1 shows a schematic diagram of a BOC modulated signal.

A schematic diagram of a BOC modulated signal is illustrated in FIG. 1. As illustrated in the figure, the BOC modulated signal comprises a pseudo random code (PRC), a sub-carrier, and a carrier, which can be expressed as $s(t)=c(t)sc(t)\cos(2\pi f_c t+\theta_0)$, where $c(t)$ denotes the pseudo random code, $sc(t)$ denotes the sub-carrier, $f_c$ denotes a carrier frequency, and $\theta_0$ denotes an initial phase of carrier. The sub-carrier can be expressed as $sc(t)=\text{sign}(\sin(2\pi f_s t))$, where $f_s$ stands for a sub-carrier frequency. The sub-carrier frequency $f_s = m \times 1.023$ MHz, and the frequency of pseudo random code $f_{code} = n \times 1.023$ MHz, then the BOC modulated signal is denoted as BOC(m, n), and a modulation order k of the BOC modulated signal is defined as $k=2m/n$.

Figure 2:
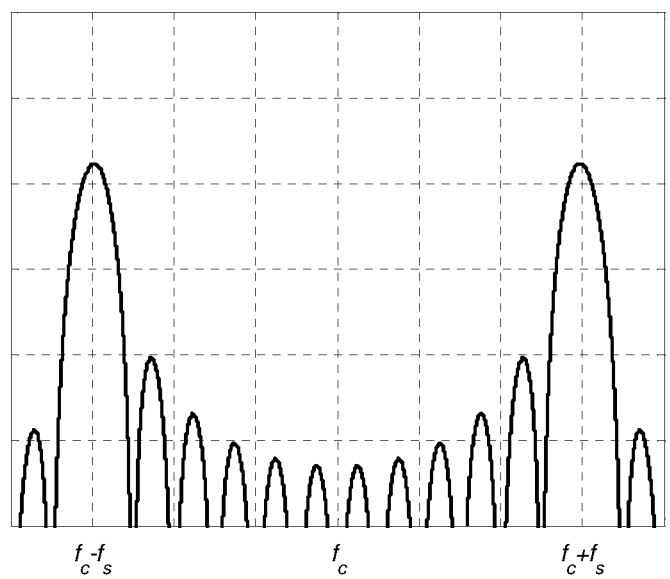
FIG. 2 shows a schematic diagram of a power spectra density of a BOC modulated signal.
Figure 3:
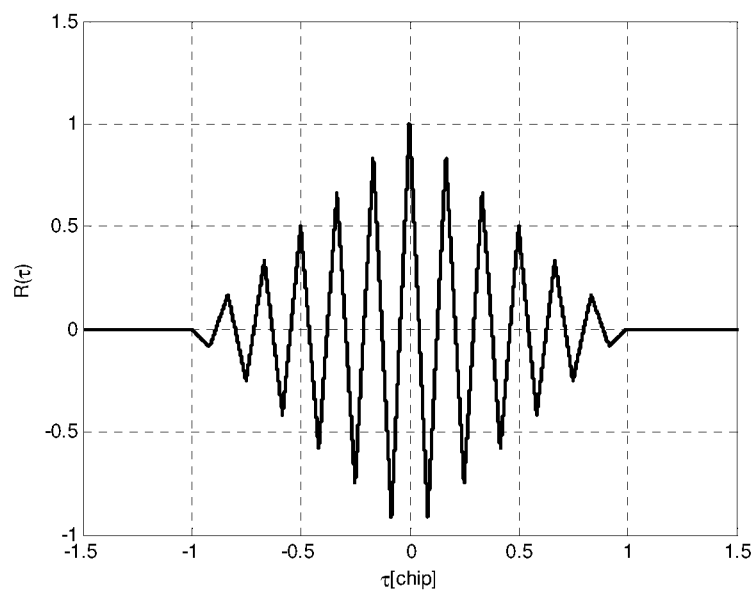
FIG. 3 shows a schematic diagram of an auto-correlation function of a BOC modulated signal.

A schematic diagram of a power spectrum density (PSD) of a BOC modulated signal is illustrated in FIG. 2. As illustrated in the figure, the PSD of BOC modulated signal appears having the split spectrum feature with two main lobes located on either side of a central frequency of carrier. FIG. 3 shows a schematic diagram of an auto correlation function (ACF) of a BOC modulated signal. As shown, the ACF of BOC modulated signal is of multiple peaks in the number of 2k−1, while an ACF of the traditional BPSK-modulated signal is of single one peak. Therefore, it is necessary for a receiver to lock onto the primary peak of the ACF, otherwise an unacceptable biased delay estimate will be generated. Therefore, if conventional techniques are used to receive wideband BOC modulated signals, the receiver may, in error, lock onto a certain secondary peak of the ACF. This is the false-lock phenomenon of BOC modulated signals.

DETAILED DESCRIPTION

Hereinafter, with reference to the appended drawings, a detailed description on a receiver and receiving method for wideband BOC modulated signals according to the present application will be presented. For simplicity, in the description of the embodiments of the present application, the same or similar reference numeral is used for the same or similar device.

Figure 4:
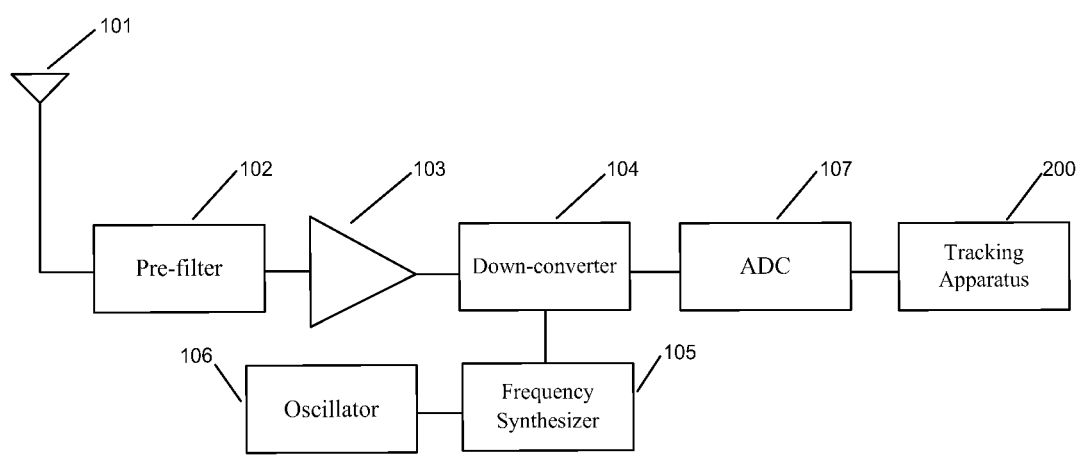
FIG. 4 shows a schematic diagram of a receiver according to the prior art.

FIG. 4 shows a schematic diagram of a receiver according to the prior art. A receiver 100 receives navigation signals to perform positioning and navigation. In general, the receiver 100 receives radio frequency (RF) signals, such as wideband BOC modulated signals, of all visible satellites via an antenna 101. The antenna 101 feeds the received RF signals to the front-end components, which comprises a pre-filter 102 for filtering received signals and a pre-amplifier 103 for amplifying the received signals. The front-end components feed the filtered and amplified signals to a down-converter 104, which down-converts the amplified signals into immediate frequency (IF) or baseband signals through the mixture with local signals generated by a frequency synthesizer 105. The frequency synthesizer 105 is driven by an oscillator 106 which provides the reference clock signal. The down-converter 104 feeds the IF or baseband signals to an Analog-to-Digital Converter (ADC) 107 for converting analog signals to digital signals. The ADC feeds the digital signals to a tracking apparatus 200 for further processing.

Figure 5:
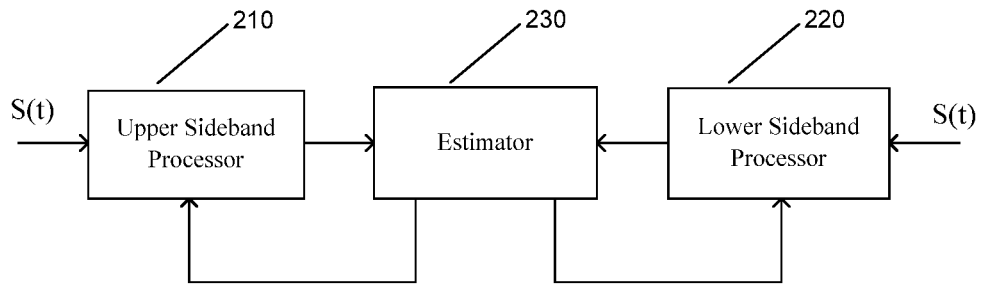
FIG. 5 shows a schematic diagram of a tracking apparatus of a receiver according to an embodiment of the present application.

FIG. 5 shows a schematic diagram of a tracking apparatus according to an embodiment of the present application. As shown in FIG. 5, the tracking apparatus 200 of the receiver 100 comprises an upper sideband processor 210, a lower sideband processor 220 and an estimator 230. The upper sideband processor 210 correlates a local upper sideband replica against the received navigation signal, obtaining upper sideband correlations containing the delay information of navigation signal. The lower sideband processor 220 correlates a local lower sideband replica against the received navigation signal, obtaining lower sideband correlations containing the delay information of navigation signal. The estimator 230 calculates a delay estimate based on the upper sideband correlations and the lower sideband correlations. It is possible to realize a joint estimation of upper and lower sidebands through the receiver according to the present application.

Figure 6:
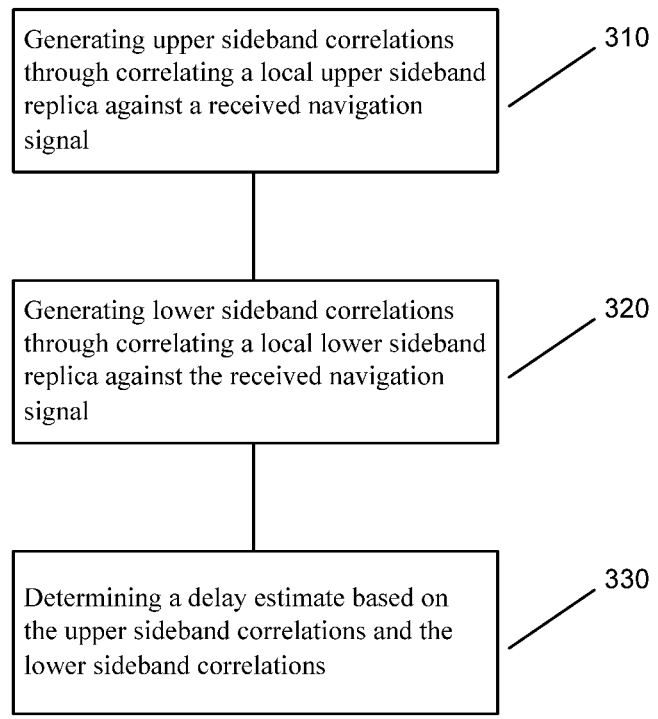
FIG. 6 shows a flow chart of a receiving method according to an embodiment of the present application.

FIG. 6 shows a flow chart of a receiving method according to an embodiment of the present application. As shown in FIG. 6, in Step 310, upper sideband correlations containing the delay information of navigation signal are generated through correlating a local upper sideband replica against the received navigation signal. In Step 320, lower sideband correlations containing the delay information of navigation signal are generated through correlating a local lower sideband replica against the received navigation signal. In Step 330, a delay estimate is determined based on the upper sideband and lower sideband correlations.

According to an embodiment of the present application, the upper sideband correlations contain the code delay information and the coupled sub-carrier and carrier delay information of the upper sideband, and the lower sideband correlations contain the code delay information and the coupled sub-carrier and carrier delay information of the lower sideband. The estimator 230 is operable to coherently combine the upper sideband correlations and the lower sideband correlations to decouple the coupled sub-carrier and carrier delay information and to estimate a code delay, a sub-carrier delay and a carrier delay.

Hereinbelow, embodiments of the receiver and receiving method according to the present application will be described in the context of exemplary AltBOC modulated navigation signals.

The wideband Galileo E5 signal is generated using the AltBOC modulation with the code chip rate $f_c=10.23$ MHz and the sub-carrier frequency $f_s=15.345$ MHz, and its baseband signal can be expressed as follows:

$$S_{E5}(t) = \frac{1}{2\sqrt{2}}(e_{E5a-I}(t) + je_{E5a-Q}(t))[sc_{E5-S}(t) - jsc_{E5-S}(t - T_{s,E5}/4)] +$$

$$\frac{1}{2\sqrt{2}}(e_{E5b-I}(t) + je_{E5b-Q}(t))[sc_{E5-S}(t) + jsc_{E5-S}(t - T_{s,E5}/4)] +$$

$$\frac{1}{2\sqrt{2}}(\bar{e}_{E5a-I}(t) + j\bar{e}_{E5a-Q}(t))[sc_{E5-P}(t) - jsc_{E5-P}(t - T_{s,E5}/4)] +$$

$$\frac{1}{2\sqrt{2}}(\bar{e}_{E5b-I}(t) + j\bar{e}_{E5b-Q}(t))[sc_{E5-P}(t) + jsc_{E5-P}(t - T_{s,E5}/4)]$$

where $e_{E5a-I}(t)$ is a pseudo random code of data component in the lower sideband which is modulated with a secondary code and navigation message, $e_{E5a-Q}(t)$ is a pseudo random code of pilot component in the lower sideband which is modulated with a secondary code, $e_{E5b-I}(t)$ is a pseudo random code of data component in the upper sideband which is modulated with a secondary code and navigation message, $e_{E5b-Q}(t)$ is a pseudo random code of pilot component in the upper sideband which is modulated with a secondary code, $\bar{e}_{E5a-I}(t)$, $\bar{e}_{E5a-Q}(t)$ $\bar{e}_{E5b-I}(t)$ and $\bar{e}_{E5b-Q}(t)$ donate intermodulation components, and $sc_{E5-S}(t)$ and $sc_{E5-P}(t)$ denote sub-carriers of the pseudo random code and intermodulation components, respectively.

On one hand, the intermodulation components $\bar{e}_{E5a-I}(t)$, $\bar{e}_{E5a-Q}(t)$, $\bar{e}_{E5b-I}(t)$ and $\bar{e}_{E5b-Q}(t)$ are introduced for realizing a constant envelop modulation at the transmitting end, and are useless for users. On the other hand, due to the limited transmission bandwidth of Galileo E5 satellite, the above-described sub-carriers can be approximated as:

$$sc_{E5-S}(t) - jsc_{E5-S}(t - T_{s,E5}/4) \Box \frac{4}{\pi}\exp(-j2\pi f_s t);$$

$$sc_{E5-S}(t) + jsc_{E5-S}(t - T_{s,E5}/4) \Box \frac{4}{\pi}\exp(j2\pi f_s t).$$

Therefore, with the amplitude terms ignored, the baseband signal of the useful part can be expressed as follows:

$$\bar{s}_{E5}(t)=(e_{E5a-I}(t)+je_{E5a-Q}(t))\exp(-j2\pi f_s t)+(e_{E5b-I}(t)+je_{E5b-Q}(t))\exp(j2\pi f_s t)$$

and the band-pass signal of the useful part can be expressed as follows:

$$\tilde{s}_{E5}(t) = R(\bar{s}_{E5}(t)\exp(j2\pi f_c t + \theta_0))$$

$$= \begin{pmatrix} e_{E5a-I}(t)\cos(2\pi(f_c - f_s)t + \theta_0) - \\ e_{E5a-Q}(t)\sin(2\pi(f_c - f_s)t + \theta_0) + \\ e_{E5b-I}(t)\cos(2\pi(f_c + f_s)t + \theta_0) - \\ e_{E5b-Q}(t)\sin(2\pi(f_c + f_s)t + \theta_0) \end{pmatrix},$$

where $\theta$ denotes an initial phase of carrier.

A received signal can be expressed as follows:

$$s(t) = \tilde{s}_{E5}(t-\tau)$$

$$= \begin{pmatrix} e_{E5a-I}(t-\tau)\cos(2\pi(f_c - f_s)t + \theta - \varphi) - \\ e_{E5a-Q}(t-\tau)\sin(2\pi(f_c - f_s)t + \theta - \varphi) + \\ e_{E5b-I}(t-\tau)\cos(2\pi(f_c + f_s)t + \theta + \varphi) - \\ e_{E5b-Q}(t-\tau)\sin(2\pi(f_c + f_s)t + \theta + \varphi) \end{pmatrix},$$

where $\tau$ donates a delay in propagation of the received signal, $\theta = \theta_0 - 2\pi f_c \tau$ represents a carrier phase of the received signal, and $\varphi = 2\pi f_s \tau$ represents a sub-carrier phase of the received signal.

In general, the pilot component is adopted for a receiver to perform tracking, and therefore an input signal of the tracking apparatus can be further expressed as follows:

$$s(t) = c_a(t-\tau)\sin(2\pi(f_c+f_s)t+\theta+\varphi) + c_b(t-\tau)\sin(2\pi(f_c-f_s)t+\theta+\varphi),$$

where the signals $e_{E5a-Q}(t-\tau)$ and $e_{E5b-Q}(t-\tau)$ are replaced here by two general baseband signals $c_a(t-\tau)$ and $c_b(t-\tau)$ to extract a general reception model.

According to an embodiment of the present application, the upper sideband processor 210 obtains upper sideband correlations through correlating a local upper sideband replica (reference signal) against a received navigation signal.

Figure 7:
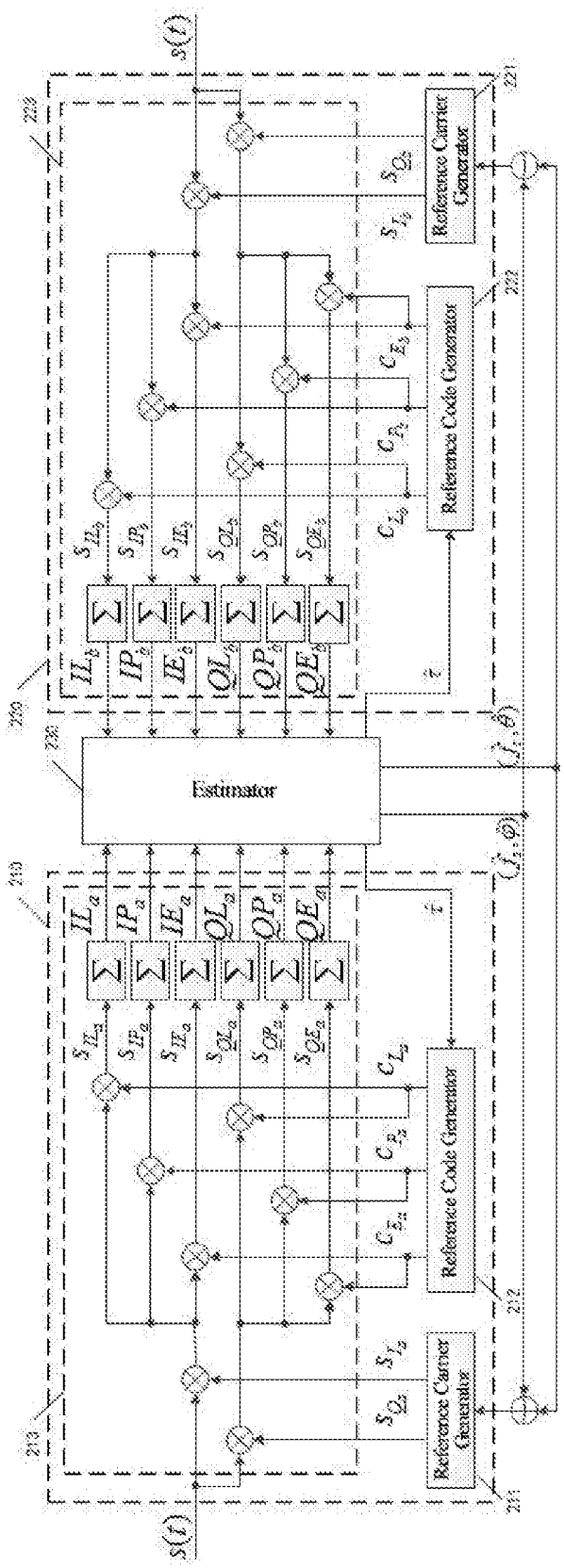
FIG. 7 shows a schematic diagram of a tracking apparatus of a receiver according to another embodiment of the present application.

According to an embodiment, as shown in FIG. 7, the upper sideband processor 210 may comprise a first reference carrier generator 211, a first reference code generator 212, and a first correlator unit 213.

The first carrier reference generator 211 generates a local reference carrier signal of upper sideband with reference to the feedback of the estimator 230. For example, the delay estimates of carrier and of sub-carrier fed back from the estimator 230 are combined and input to the first carrier reference generator 211, so as to drive a first numerically-controlled oscillator (NCO) of carrier and generate local reference carrier signals of I and Q branches of upper sideband, respectively, i.e., $$s_{I_a}(t) = \sin(2\pi(\hat{f}^*_c + \hat{f}^*_s)t + \hat{\theta}^* + \hat{\varphi}^*), \text{ and}$$

$$s_{Q_a}(t) = \cos(2\pi(\hat{f}^*_c + \hat{f}^*_s)t + \hat{\theta}^* + \hat{\varphi}^*), \text{ and}$$

where $\hat{f}^*_s$ and $\hat{\varphi}^*$ represent the frequency and phase of local reference sub-carrier, respectively, and $\hat{f}_c$ and $\hat{\theta}^*$ represent the frequency and phase of local reference carrier, respectively.

The first reference code generator 212 generates a local reference code signal of upper sideband with reference to the feedback of the estimator 230. For example, the first reference code generator 212 uses the delay estimate of code fed back by the estimator 230, to drive a NCO of code and generate an early, a prompt and a late reference code signal of upper sideband, respectively, i.e., $$c_{E_a}(t) = c_a(t-\hat{\tau}^*+D/2),$$

$$c_{P_a}(t) = c_a(t-\hat{\tau}^*), \text{ and}$$

$$c_{L_a}(t) = c_a(t-\hat{\tau}^*-D/2),$$

where $\hat{\tau}^*$ represents a delay information of local reference code.

The first correlator unit 213 correlates the local reference carrier signal of upper sideband and the local reference code signal of upper sideband against the received navigation signal, so as to generate an early, a prompt and a late correlation of I branch of upper sideband as well as an early, a prompt and a late correlation of Q branch of upper sideband, respectively.

According to an embodiment, the first correlator unit 213 may multiply the reference carrier signal of upper sideband and the reference code signal of upper sideband by the received navigation signal, so as to obtain an early, a prompt and a late demodulated signal of I branch of upper sideband, respectively, i.e., $s_{IE_a}(t)$, $s_{IP_a}(t)$ and $s_{IL_a}(t)$, as well as an early, a prompt and a late demodulated signal of Q branch of upper sideband, respectively, i.e., $s_{QE_a}(t)$, $S_{QP_a}(t)$ and $S_{QL_a}(t)$, in particular, $$s_{IE_a}(t) = s(t)c_a(t-\hat{\tau}^*-D/2)\sin(2\pi(\hat{f}^*_c+\hat{f}^*_s)t+\hat{\theta}^*+\hat{\varphi}^*),$$

$$s_{IP_a}(t) = s(t)c_a(t-\hat{\tau}^*)\sin(2\pi(\hat{f}^*_c+\hat{f}^*_s)t+\hat{\theta}^*+\hat{\varphi}^*),$$

$$s_{IL_a}(t) = s(t)c_a(t-\hat{\tau}^*+D/2)\sin(2\pi(\hat{f}^*_c+\hat{f}^*_s)t+\hat{\theta}^*+\hat{\varphi}^*),$$

$$s_{QE_a}(t) = -s(t)c_a(t-\hat{\tau}^*-D/2)\cos(2\pi(\hat{f}^*_c+\hat{f}^*_s)t+\hat{\theta}^*+\hat{\varphi}^*),$$

$$s_{QP_a}(t) = -s(t)c_a(t-\hat{\tau}^*)\cos(2\pi(\hat{f}^*_c+\hat{f}^*_s)t+\hat{\theta}^*+\hat{\varphi}^*), \text{ and}$$

$$s_{QL_a}(t) = -s(t)c_a(t-\hat{\tau}^*+D/2)\cos(2\pi(\hat{f}^*_c+\hat{f}^*_s)t+\hat{\theta}^*+\hat{\varphi}^*).$$

Then, those signals are integrated respectively, obtaining an early, a prompt and a late correlation of I branch of upper sideband as well as an early, a prompt and a late correlation of Q branch of upper sideband.

It can be seen that the code delay information ($\hat{\tau}$) and the coupled carrier and sub-carrier delay information ($\hat{f}_c+\hat{f}_s$, $\hat{\theta}+\hat{\varphi}$) of the upper sideband are contained in the signals $s_{IE_a}(t)$, $s_{IP_a}(t)$, $S_{IL_a}(t)$, $S_{QE_a}(t)$, $S_{QE_a}(t)$ and $s_{QL_a}(t)$, and therefore contained in the correlations of those signals. The correlations of upper sideband may be expressed as:

$$IE_a \Box R_a(\Delta\tau+D/2)T \, \text{sinc}(\alpha)\cos(\alpha+\Delta\theta+\Delta\varphi),$$

$$IP_a | R_a(\Delta\tau)T \, \text{sinc}(\alpha)\cos(\alpha+\Delta\theta+\Delta\varphi),$$

$$IL_a | R_a(\Delta\tau+D/2)T \, \text{sinc}(\alpha)\cos(\alpha+\Delta\theta+\Delta\varphi),$$

$$QE_a \, \lrcorner \, R_a(\Delta\tau+D/2)T \, \text{sinc}(\alpha)\cos(\alpha+\Delta\theta+\Delta\varphi),$$

$$QP_a \, \lrcorner \, R_a(\Delta\tau)T \, \text{sinc}(\alpha)\sin(\alpha+\Delta\theta+\Delta\varphi), \text{ and}$$

$$QL_a \Box R_a(\Delta\tau+D/2)T \, \text{sinc}(\alpha)\sin(\alpha+\Delta\theta+\Delta\varphi),$$

where $R_a(\tau)$ represents an upper sideband ACF of code, $\Delta\tau=\tau-\hat{\tau}^*$ represents a delay estimate error of code, $\Delta\varphi=\varphi-\hat{\varphi}^*$ represents a delay estimate error of sub-carrier, $\Delta\theta=\theta-\hat{\theta}^*$ represents a delay estimate error of carrier, D represents a correlator spacing between an early and a late correlator, and T represents a pre-detection integration time. Besides, $\alpha$ is introduced here for simplification of expression, and $\alpha=\pi(\Delta f_c+\Delta f_s)T$, where $\Delta f_s=f_s-\hat{f}_s^*$, represents an estimate error of sub-carrier frequency and $\Delta f_c f_c - \hat{f}_c^*$ represents an estimate error of carrier frequency.

The lower sideband processor 220 obtains lower sideband correlations through correlating a local lower sideband replica (reference signal) against the received navigation signal.

According to an embodiment, as shown in FIG. 7, the lower sideband processor 220 may comprise a second reference carrier generator 221, a second reference code generator 222, and a second correlator unit 223.

The second carrier reference generator 221 generates a local reference carrier signal of lower sideband with reference to the feedback of the estimator 230. For example, the delay estimates of carrier and sub-carrier fed back from the estimator 230 are combined and input to the second carrier reference generator 221, so as to drive a second numericallycontrolled-oscillator (NCO) of carrier and generate local reference carrier signals of I and Q branches of lower sideband, respectively, i.e., $$s_{I_b}(t) = \sin(2\pi(\hat{f}^*_c - \hat{f}^*_s)t + \hat{\theta}^* - \hat{\varphi}^*), \text{ and}$$

$$s_{Q_b}(t) = -\cos(2\pi(\hat{f}^*_c - \hat{f}^*_s)t + \hat{\theta}^* - \hat{\varphi}^*),$$

where $\hat{f}^*_s$ and $\hat{\varphi}^*$ represent the frequency and phase of local reference sub-carrier, respectively, and $\hat{f}^*_c$ and $\hat{\theta}^*$ represent the frequency and phase of local reference carrier, respectively.

The second reference code generator 222 generates a local reference code signal of lower sideband with reference to the feedback of the estimator 230. For example, the second reference code generator 222 uses the delay estimate of pseudo random code fed back by the estimator 230, to drive a NCO of pseudo random code and generate an early, a prompt and a late reference code signal of lower sideband, respectively, i.e., $$c_{E_b}(t) = c_b(t - \hat{\tau}^* + D/2),$$

$$c_{P_b}(t) = c_b(t - \hat{\tau}^*), \text{ and}$$

$$c_{L_b}(t) = c_b(t - \hat{\tau}^* - D/2),$$

where $\hat{\tau}^*$ represents a delay information of local reference code.

As mentioned above, here the exemplary navigation signal is AltBOC, in which the pseudo random code used in the upper sideband is different from the pseudo random code used in the lower sideband. Thus, in the embodiment, the first reference code generator 212 of the upper sideband may be different from the second reference code generator 222 of the lower sideband. It could be understood that if a navigation signal other than AltBOC is used, where the pseudo random code used in the upper sideband is the same as that used in the lower sideband, the upper sideband and the lower sideband may share the same reference code generator.

The second correlator unit 223 correlates the local reference carrier signal of lower sideband and the local reference code signal of lower sideband against the received navigation signal, so as to generate an early, a prompt and a late correlation of I branch of lower sideband as well as an early, a prompt and a late correlation of Q branch of lower sideband, respectively.

According to an embodiment, the second correlator unit 223 may multiply the reference carrier signal of lower sideband and the reference code signal of lower sideband by the received navigation signal, so as to obtain an early, a prompt and a late demodulated signal of I branch of lower sideband, respectively, i.e., $s_{IE_b}(t)$, $s_{IP_b}(t)$ and $s_{IL_b}(t)$, as well as an early, a prompt and a late demodulated signal of Q branch of lower sideband, respectively, i.e., $s_{QE_b}(t)$, $s_{QP_b}(t)$ and $s_{QL_b}(t)$, in particular, $$s_{IE_b}(t) = s(t)c_b(t - \hat{\tau}^* - D/2)\sin(2\pi(\hat{f}^*_c - \hat{f}^*_s)t + \hat{\theta}^* - \hat{\varphi}^*),$$

$$s_{IP_b}(t) = s(t)c_b(t - \hat{\tau}^*)\sin(2\pi(\hat{f}^*_c - \hat{f}^*_s)t + \hat{\theta}^* - \hat{\varphi}^*),$$

$$s_{IL_b}(t) = s(t)c_b(t - \hat{\tau}^* - D/2)\sin(2\pi(\hat{f}^*_c - \hat{f}^*_s)t + \hat{\theta}^* - \hat{\varphi}^*),$$

$$s_{QE_b}(t) = -s(t)c_b(t - \hat{\tau}^* - D/2)\cos(2\pi(\hat{f}^*_c - \hat{f}^*_s)t + \hat{\theta}^* - \hat{\varphi}^*),$$

$$s_{QP_b}(t) = -s(t)c_b(t - \hat{\tau}^*)\cos(2\pi(\hat{f}^*_c - \hat{f}^*_s)t + \hat{\theta}^* - \hat{\varphi}^*), \text{ and}$$

$$s_{QL_b}(t) = -s(t)c_b(t - \hat{\tau}^* - D/2)\cos(2\pi(\hat{f}^*_c - \hat{f}^*_s)t + \hat{\theta}^* - \hat{\varphi}^*).$$

Then, those signals are integrated respectively, obtaining an early, a prompt and a late correlation of I branch as well as an early, a prompt and a late correlation of Q branch of lower sideband.

It can be seen that the code delay information ($\hat{\tau}$) and the coupled carrier and sub-carrier delay information ($\hat{f}_c - \hat{f}_s$, $\hat{\theta} - \hat{\varphi}$) of the lower sideband are contained in the signals $s_{IE_b}(t)$, $s_{IP_b}(t)$, $s_{IL_b}(t)$, $s_{QE_b}(t)$, $s_{QP_b}(t)$ and $S_{QL_b}(t)$, and therefore contained in the correlations of those signals. The correlations of lower sideband may be expressed as:

$$IE_b \Box R_b(\Delta\tau + D/2)T \, \text{sinc}(\beta)\cos(\beta + \Delta\theta - \Delta\varphi),$$

$$IP_b | R_b(\Delta\tau)T \, \text{sinc}(\beta)\cos(\beta + \Delta\theta - \Delta\varphi),$$

$$IL_b \Box R_b(\Delta\tau + D/2)T \, \text{sinc}(\beta)\cos(\beta + \Delta\theta - \Delta\varphi),$$

$$QE_b | R_b(\Delta\tau + D/2)T \, \text{sinc}(\beta)\sin(\beta + \Delta\theta - \Delta\varphi),$$

$$QP_b \Box R_b(\Delta\tau)T \, \text{sinc}(\beta)\sin(\beta + \Delta\theta - \Delta\varphi), \text{ and}$$

$$QL_b | R_b(\Delta\tau + D/2)T \, \text{sinc}(\beta)\sin(\beta + \Delta\theta - \Delta\varphi),$$

where $R_b(\tau)$ represents a lower sideband ACF of code, $\Delta\tau = \tau - \hat{\tau}^*$ represents a delay estimate error of code, $\Delta\varphi = \varphi - \hat{\varphi}^*$ represents a delay estimate error of sub-carrier, $\Delta\theta = \theta - \hat{\theta}^*$ represents a delay estimate error of carrier, D represents a correlator spacing between an early and a late correlator, and T represents a pre-detection integration time. Besides, $\beta$ is introduced here for simplification of expression, $\beta = \pi(\Delta f_c - \Delta f_s)T$, where $\Delta f_s = f_s - \hat{f}^*_s$ represents an estimate error of sub-carrier frequency and $\Delta f_c = f_c - \hat{f}^*_c$ represent an estimate error of carrier frequency.

According to an embodiment of the present application, the estimator 230 coherently combines the upper sideband correlations and the lower sideband correlations to decouple the sub-carrier and carrier delay information and then estimate a code delay, a sub-carrier delay and a carrier delay.

Figure 8:
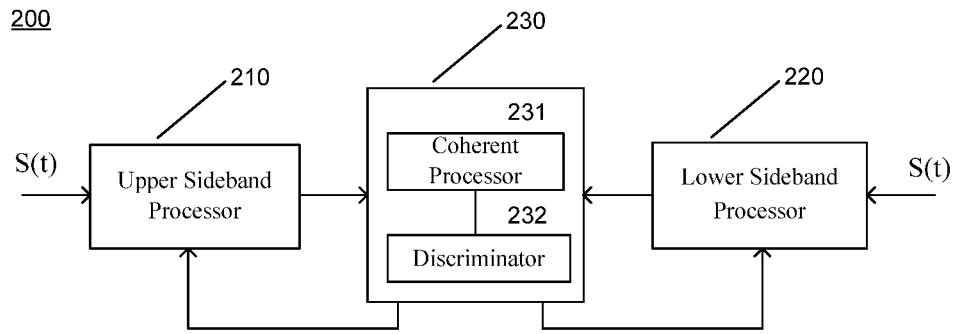
FIG. 8 shows a schematic diagram of a tracking apparatus of a receiver according to another embodiment of the present application.

The estimator 230 may comprise a coherent processor 231 and a discriminator 232, as shown in FIG. 8.

The coherent processor 231 may coherently combine the early, the prompt and the late correlation of I branch of upper sideband with the early, the prompt and the late correlation of I branch of lower sideband, and coherently combine the early, the prompt and the late correlation of Q branch of upper sideband with the early, the prompt and the late correlation of Q branch of lower sideband.

$$IIE = IE_a + IE_b | 2R(\Delta\tau - D/2)T \cos(\pi\Delta f_c T + \Delta\theta)\cos(\pi\Delta f_s T + \Delta\varphi),$$

$$IIE = IL_a + IL_b | 2R(\Delta\tau - D/2)T \cos(\pi\Delta f_c T + \Delta\theta)\cos(\pi\Delta f_s T + \Delta\varphi),$$

$$IQP = QP_b - QP_a \Box 2R(\Delta\tau)T \cos(\pi\Delta f_c T + \Delta\theta)\sin(\pi\Delta f_s T + \Delta\varphi),$$

$$QIP = QP_a + QP_b \Box 2R(\Delta\tau)T \sin(\pi\Delta f_c T + \Delta\theta)\cos(\pi\Delta f_s T + \Delta\varphi), \text{ and}$$

$$IIP = IP_a + IP_b \Box 2R(\Delta\tau)T \cos(\pi\Delta f_c T + \Delta\theta)\cos(\pi\Delta f_s T + \Delta\varphi).$$

Here, the coupled sub-carrier and carrier delay information has been decoupled. That is, a delay estimate error of sub-carrier ($\Delta f_s$, $\Delta\varphi$) and a delay estimate error of carrier ($\Delta f_c$, $\Delta\theta$) have been well separated.

In general, the ACF of code of upper sideband $R_a(\tau)$ and the ACF of code of lower sideband $R_b(\tau)$ of the wideband BOC modulated signals may be deemed as identical to a standard triangle function $R(\tau)$.

The discriminator 232 implements discriminating operations based on the decoupled sub-carrier and carrier delay information and the code delay information, so as to obtain estimates of code delay, sub-carrier delay and carrier delay.

In an example, the discriminator 232 may include a code discriminator for implementing a coherent code discriminating to obtain a delay estimate error of code $\Delta\tau$. The coherent code discriminating may be expressed as follows:

$$\text{disc}_{Coh}(\tau)=IIE-IIL\rceil K_{Coh}\Delta\tau,$$

where $K_{Coh}$ denotes the gain of the coherent code discriminator.

Alternatively, the discriminator 232 may include a code discriminator for implementing a non-coherent code discriminating to obtain a delay estimate error of code $\Delta\tau$. The non-coherent code discriminating may be expressed as follows:

$$\text{disc}_{Non}(\tau)=(IE^2{}_a QE^2{}_a + IE^2{}_b + QE^2{}_b) - (IL^2{}_a + QL^2{}_a +$$
$$IL^2{}_b + QL^2{}_b) \mid\mid K_{Non}\Delta\tau,$$

where $K_{Non}$ denotes the gain of the non-coherent code discriminator.

The discriminator 232 may further include a sub-carrier and carrier discriminator for implementing the phase-lock-loop (PLL) discriminating to obtaining delay estimate errors of sub-carrier and carrier. The PLL discriminating may be expressed as follows:

$$\text{disc}(\varphi)=a\tan 2(QP_b-IP_a+IP_b)\square \pi\Delta f_s T+\Delta\varphi, \text{ and}$$

$$\text{disc}(\theta)=a\tan 2(QP_1+QP_b, IP_a+IP_b)\square \pi\Delta f_s T+\Delta\varphi, \text{ and}$$

According to an embodiment of the present application, delay estimate errors of code $(\Delta\tilde{\tau})$, of sub-carrier $(\Delta\tilde{f}_s, \Delta\tilde{\varphi})$ and of carrier $(\Delta\tilde{f}_c, \Delta\tilde{\theta})$ may be further smooth-filtered, so as to estimate the code delay, the sub-carrier delay and the carrier delay as follows, $$\hat{\tau}^* + \Delta\tilde{\tau} \to \hat{\tau},$$

$$(\hat{f}^*_s, \hat{\varphi}^*) + (\Delta\tilde{f}_s, \Delta\tilde{\varphi}) \to (\hat{f}_s, \hat{\varphi}), \text{ and}$$

$$(\hat{f}^*_c, \hat{\theta}^*) + (\Delta\tilde{f}_c, \Delta\tilde{\theta}) \to (\hat{f}_c, \hat{\theta}).$$

It can be appreciated that, according to the receiver and receiving method of the present application, it is possible to obtain estimates of code delay $(\hat{\tau})$ of sub-carrier delay $(\hat{f}_s, \hat{\varphi})$ and of carrier delay $(\hat{f}_c, \hat{\theta})$ independently. The estimator may determine an optimal delay estimate based on the estimated code delay, the sub-carrier delay and/or the carrier delay using, such as, unambiguous combinations of these independent delay estimates.

It can be appreciated that a plurality of groups of upper sideband processors, lower sideband processors and estimators can be integrated in a navigation device, enabling tracking of multiple navigation signals.

The receiver according to the present application is of an architecture design incorporating two groups of conventional BPSK processor, which therefore is easy to be implemented. For example, the upper sideband processor and the lower sideband processor of the receiver according to the present application can be implemented by retrofitting BPSK correlator structure of the existing receiver.

In addition, the architecture of the present application allows the receiver to be easily switched between the dual-band estimation mode utilizing the upper and lower sideband processor and the single-band estimation mode utilizing either sideband processor.

Figure 9:
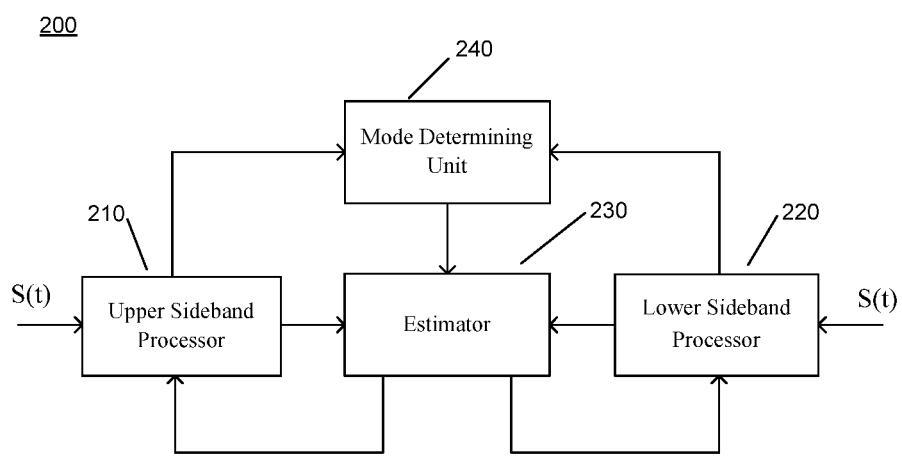
FIG. 9 shows a schematic diagram of a tracking apparatus of a receiver according to another embodiment of the present application.

According to an embodiment of the present application, as shown in FIG. 9, the tracking apparatus 200 may further comprise a mode determining unit 240 operable to determine a working mode of the estimator 230 based on a tracking state of the receiver. For example, in the initial stage, the estimate error of the tracking apparatus is relatively large and the estimator may work in a single-band estimation mode In the single-band estimation mode, the estimator 230 may estimate the delay based on either the upper sideband correlations or the lower sideband correlations. Or if a false lock situation of the tracking apparatus has been detected, the estimator may also work in the single-band estimation mode. When the tracking apparatus operates in a relatively stable status, the estimator may be turned into a dual-band estimation mode so as to perform a more precise tracking. In the dual-band estimation mode, the estimator 230 may estimate the delay through coherently combining the upper and lower sideband correlations. In this way, it is possible to avoid the false lock by easily transferring between the estimation modes, so as to obtain a robust tracking. In the embodiment, both the single-band and dual-band processing schemes are incorporated into a unified tracking architecture, by which the interference avoidance potential and improved ranging performance of BOC signal are achieved respectively.

Although in the above description the AltBOC signal is taken as an example of navigation signal. It is appreciated that the receiver or receiving method of the present application can be used in any wideband BOC modulated navigation signal, only if the navigation signal contains an upper sideband and a lower sideband.

Embodiments of the present application may be implemented by hardware, software or the combination thereof. In addition, an aspect of the present application provides a program including executable instructions to implement the receiving method for wideband BOC modulated signals according to embodiments of the present application. The program can be stored in storage of any form, such as optical or magnetic readable media, chip, ROM, PROM, or any form of volatile or non-volatile memory device. According to an example of the embodiment of the present application, a machine-readable storage is provided for storing the program.

While various embodiments of the present application have been described above referring to the drawings, it should be understood that they have been presented by way of example only, but not limitation. It will be apparent to those skilled in the art that various changes in form and detail can be made therein without departing from the spirit and scope of the invention.

What is claimed is:

1. A receiver for receiving navigation signals, the receiver comprising:
   a tracking apparatus including:
   an upper sideband processor configured to generate upper sideband correlations through correlating a local upper sideband replica against a received navigation signal, wherein the upper sideband correlations contain code delay information and coupled sub-carrier and carrier delay information of upper sideband;
   a lower sideband processor configured to generate lower sideband correlations through correlating a local lower sideband replica against the received navigation signal, wherein the lower sideband correlations contain code delay information and coupled sub-carrier and carrier delay information of lower sideband; and
   an estimator configured to determine a delay estimate based on the upper sideband correlations and the lower sideband correlations, wherein the estimator is operable to coherently combine the upper sideband correlations and the lower sideband correlations to decouple the coupled sub-carrier and carrier delay information and to estimate at least one of a code delay, a sub-carrier delay and a carrier delay.

2. The receiver as claimed in claim 1, wherein the estimator is configured to feed back at least one of the estimated code delay, sub-carrier delay and carrier delay to the upper sideband processor for generating the local upper sideband replica and to the lower sideband processor for generating the local lower sideband replica.

3. The receiver as claimed in claim 1, wherein the upper sideband correlations generated by the upper sideband processor include an early, a prompt and a late correlation of an I branch of the upper sideband and an early, a prompt and a late correlation of a Q branch of the upper sideband, and the lower sideband correlations generated by the lower sideband processor include an early, a prompt and a late correlation of an I branch of the lower sideband and an early, a prompt and a late correlation of a Q branch of the lower sideband.

4. The receiver as claimed in claim 3, wherein the estimator comprises:
a coherent processor configured to coherently combine the early, the prompt and the late correlation of the I branch of the upper sideband with the early, the prompt and the late correlation of the I branch of the lower sideband, and to coherently combine the early, the prompt and the late correlation of the Q branch of the upper sideband with the early, the prompt and the late correlation of the Q branch of the lower sideband, so as to obtain code delay information and decoupled sub-carrier and carrier delay information; and
a discriminator configured to estimate a code delay, a sub-carrier delay and a carrier delay by discriminating combination results from the coherent processor containing the code delay information and decoupled sub-carrier and carrier delay information.

5. The receiver as claimed in claim 4, wherein
the upper sideband processor comprises:
a first reference carrier generator configured to generate a local reference carrier signal of the upper sideband based on the estimated sub-carrier and carrier delays fed back from the estimator,
a first reference code generator configured to generate a local reference code signal of the upper sideband based on the estimated code delay fed back from the estimator, and
a first correlator unit configured to correlate the local reference carrier signal of the upper sideband and the local reference code signal of the upper sideband against the received navigation signal; and
the lower sideband processor comprises:
a second reference carrier generator configured to generate a local reference carrier signal of the lower sideband based on the estimated sub-carrier and carrier delays fed back from the estimator,
a second reference code generator configured to generate a local reference code signal of the lower sideband based on the estimated code delay fed back from the estimator, and
a second correlator unit configured to correlate the local reference carrier signal of the lower sideband and the local reference code signal of the lower sideband against the received navigation signal.

6. The receiver as claimed in claim 1, wherein the navigation signals are wideband binary-offset-carrier (BOC) modulated signals.

7. The receiver as claimed in any one of claim 1, 2, 3, 4, or 5, wherein the tracking apparatus further includes a mode determining unit configured to determine a working mode of the estimator.

8. The receiver as claimed in claim 7, wherein the working mode of the estimator comprises a dual-band estimation mode and a single-band estimation mode.

9. A receiving method for receiving navigation signals, and the method comprises:
generating, by a receiver device, upper sideband correlations through correlating a local upper sideband replica against a received navigation signal, wherein the upper sideband correlations contain code delay information and coupled sub-carrier and carrier delay information of upper sideband;
generating, by the receiver device, lower sideband correlations through correlating a local lower sideband replica against the received navigation signal, wherein the lower sideband correlations contain code delay information and coupled sub-carrier and carrier delay information of lower sideband; and
determining, by the receiver device, a delay estimate based on the upper sideband correlations and the lower sideband correlations, wherein the estimator is configured to coherently combine the upper sideband correlations and the lower sideband correlations to decouple the coupled sub-carrier and carrier delay information and to estimate at least one of a code delay, a sub-carrier delay and a carrier delay.

10. The receiving method as claimed in claim 9, wherein the method further comprises feeding back at least one of the estimated code delay, sub-carrier delay and carrier delay for generating the local upper sideband replica and the local lower sideband replica.

11. The receiving method as claimed in claim 10, wherein the upper sideband correlations include an early, a prompt and a late correlation of an I branch of the upper sideband and an early, a prompt and a late correlation of a Q branch of the upper sideband, and the lower sideband correlations include an early, a prompt and a late correlation of an I branch of the lower sideband and an early, a prompt and a late correlation of a Q branch of the lower sideband.

12. The receiving method as claimed in claim 11, wherein the method further comprises:
coherently combining the early, prompt and late correlation of the I branch of the upper sideband with the early, prompt and late correlation of the I branch of the lower sideband, and coherently combining the early, prompt and late correlation of the Q branch of the upper sideband with the early, prompt and late correlation of the Q branch of the lower sideband, so as to obtain code delay information and decoupled sub-carrier and carrier delay information; and
estimating a code delay, a sub-carrier delay and a carrier delay by discriminating combination results containing the code delay information and decoupled sub-carrier and carrier delay information.

13. The receiving method as claimed in claim 12, wherein the method further comprises:
generating a local reference carrier signal of the upper sideband based on the estimated sub-carrier and carrier delays,
generating a local reference code signal of the upper sideband based on the estimated code delay, and correlating the local reference carrier signal of the upper sideband and the local reference code signal of the upper sideband against the received navigation signal; and generating a local reference carrier signal of the lower sideband based on the estimated sub-carrier and carrier delays, generating a local reference code signal of the lower sideband based on the estimated code delay fed back from the estimator, and correlating the local reference carrier signal of the lower sideband and the local reference code signal of the lower sideband against the received navigation signal.

14. The method as claimed in claim 9, wherein the navigation signals are wideband binary-offset-carrier (BOC) modulated signals.

15. The receiving method as claimed in any one of claim 9, 10, 11, 12 or 13, wherein the method further comprises:
determining a working mode for obtaining the delay estimate.

16. The receiving method as claimed in claim 15, wherein the working mode comprises a dual-band estimation mode and a single-band estimation mode.

\* \* \* \* \*